(12) United States Patent
Kusunoki et al.

(10) Patent No.: US 9,139,700 B2
(45) Date of Patent: Sep. 22, 2015

(54) METHOD FOR PREPARING A POLYORGANOSILOXANE

(71) Applicant: SHIN-ETSU CHEMICAL CO., LTD., Tokyo (JP)

(72) Inventors: Takayuki Kusunoki, Annaka (JP); Yuusuke Takamizawa, Annaka (JP); Tsutomu Kashiwagi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/044,962

(22) Filed: Oct. 3, 2013

(65) Prior Publication Data

US 2014/0107309 A1  Apr. 17, 2014

(30) Foreign Application Priority Data

Oct. 15, 2012  (JP) ................. 2012-228155

(51) Int. Cl.
*C08G 77/08* (2006.01)

(52) U.S. Cl.
CPC ..................... *C08G 77/08* (2013.01)

(58) Field of Classification Search
CPC ........................................ C08G 77/08
See application file for complete search history.

(56) References Cited

U.S. PATENT DOCUMENTS

| | | | | | |
|---|---|---|---|---|---|
| 2,452,416 | A | * | 10/1948 | Wright | 556/450 |
| 3,082,527 | A | * | 3/1963 | Nitzsche et al. | 433/214 |
| 3,431,229 | A | * | 3/1969 | Levene | 528/17 |
| 3,686,357 | A | * | 8/1972 | Cheeseman | 525/477 |
| 3,821,140 | A | * | 6/1974 | Milbert | 523/213 |
| 3,830,780 | A | * | 8/1974 | Nitzsche et al. | 528/16 |
| 4,822,830 | A | * | 4/1989 | Adkins | 523/203 |
| 5,109,093 | A | | 4/1992 | Rees et al. | |
| 5,625,022 | A | * | 4/1997 | Onishi | 528/15 |
| 5,925,723 | A | * | 7/1999 | Friebe et al. | 528/18 |
| 6,025,445 | A | * | 2/2000 | Chiba et al. | 525/326.5 |
| 6,368,535 | B1 | * | 4/2002 | Katsoulis et al. | 264/236 |
| 6,818,721 | B2 | | 11/2004 | Zha et al. | |
| 7,652,091 | B2 | * | 1/2010 | Inokuchi | 524/474 |
| 2001/0011120 | A1 | * | 8/2001 | Okawa et al. | 528/10 |
| 2002/0102417 | A1 | * | 8/2002 | Schutt et al. | 428/447 |
| 2005/0080204 | A1 | * | 4/2005 | Furukawa et al. | 525/477 |
| 2008/0188581 | A1 | * | 8/2008 | Lee et al. | 521/154 |
| 2009/0088547 | A1 | | 4/2009 | Schamschurin et al. | |
| 2014/0309447 | A1 | * | 10/2014 | Standke et al. | 556/458 |

FOREIGN PATENT DOCUMENTS

| | | |
|---|---|---|
| JP | A-2-235933 | 9/1990 |
| JP | A-3-197486 | 8/1991 |
| JP | A-2006-508216 | 3/2006 |
| JP | A-2010-506982 | 3/2010 |

OTHER PUBLICATIONS

Abstract CN 1769323, May 2006.*

* cited by examiner

*Primary Examiner* — Margaret Moore
(74) *Attorney, Agent, or Firm* — Oliff PLC

(57) ABSTRACT

One object of the present invention is to provide a method for preparing a polyorganosiloxane without using any catalyst having corrosivity and toxicity such as an alkaline earth metal catalyst in a condensation reaction of at least one organic silicon compound having a silanol group and/or an alkoxy silyl group. The present invention is a method for preparing a polyorganosiloxane, wherein the method includes a step of condensation reacting at least one organic silicon compound having at least one —OX group bonding to a silicon atom in the molecule, wherein X is a hydrogen atom, an alkyl group having 1 to 10 carbon atoms or an alkoxyalkyl group having 2 to 10 carbon atoms, in the presence of a catalyst, wherein the catalyst is at least one selected from the group having hydroxides or oxides of elements in Groups 3-15 of the periodic table.

15 Claims, No Drawings

METHOD FOR PREPARING A POLYORGANOSILOXANE

CROSS REFERENCE

This application claims the benefits of Japanese Patent application No. 2012-228155 filed on Oct. 15, 2012, the contents of which are hereby incorporated by reference.

FIELD OF THE INVENTION

The present invention relates to a method for preparing a polyorganosiloxane, specifically relates to a method for preparing a polyorganosiloxane by subjecting one or more organic silicon compounds having a silanol group, i.e., —SiOH, and/or an alkoxysilyl group, i.e., —SiOR, to a condensation reaction between each other.

BACKGROUND OF THE INVENTION

In recent years, a polyorganosiloxane has attracted attentions as a material having good light permeability, good heat resistance, low gas permeability and good chemical stability. Polyorganosiloxanes having various properties are provided by changing a type of siloxane monomers, composition of raw materials and reaction conditions in the production process. On account of this, polyorganosiloxanes have been put to practical use in the various fields.

The organopolysiloxane is generally prepared by hydrolysis and condensation reaction which are caused by contacting a chlorosilane and/or alkoxysilane with a stoichiometric amount of water in an organic solvent and in the presence of an acid or base catalyst. However, in this method, a significant amount of silanol groups remains often in the obtained polyorganosiloxane and react between each other in storage to increase the viscosity to cause a problem in storage stability. Further, the unstable silanol group remaining in the polymer may cause cracks and decrease of the adhesiveness in a long-term use. Further, because the polyorganosiloxane obtained from the hydrolysis and condensation reaction has a random structure, polyorganosiloxane with desired properties is not always obtained.

Examples of the other methods for preparing a polyorganosiloxane include a method where an organic silicon compound having a silanol group, i.e., —SiOH, condensation reacts with each other; a method where an organic silicon compound having a silanol group, i.e., —SiOH, condensation reacts with an organic silicon compound having an alkoxysilyl group, i.e., —SiOR; and a method where an organic silicon compound having a alkoxysilyl group, i.e., —SiOR, condensation reacts with each other, wherein R represents an alkyl group or an alkoxyalkyl group. In the aforesaid condensation reactions, an amount of a silanol group remaining in the polyorganosiloxane obtained is small. However, these methods need chemically fierce catalysts to cause condensation reaction, for instance, strong acids such as sulfuric acid and hydrochloric acid; strong bases such as sodium hydroxide, potassium hydroxide and tetramethylammonium hydroxide; and Lewis acids. When the aforesaid catalysts are used, siloxane bonds (Si—O—Si) are cut to cause rearrangement during the reaction and, therefore, the polyorganosiloxane obtained has a random structure.

Japanese Patent Application Laid-Open No. H02-235933 describes that a borate or phosphate of sodium or potassium is used as a catalyst and a silanol-containing siloxanes is subjected to a condensation reaction in the presence of the catalyst to prepare an organosilicone condensate. Japanese Patent Application Laid-Open No. H03-197486 describes that silanol-containing siloxanes is subjected to a condensation reaction in the presence of a catalyst selected from the group consisting hydroxide, chloride, oxide and basic metal salt of an alkali metal or alkaline earth metal to prepare a polyorganosiloxane. Japanese National Phase Publication No. 2006-508216 describes that hydroxide of magnesium or calcium can work as a catalyst in condition of the presence of a protonic solvent to promote a condensation reaction between a silanol-containing siloxane and an alkoxysilane. Japanese National Phase Publication No. 2010-506982 describes that a silicon containing compound having a silanol group and/or an alkoxysilyl group reacts in the presence of a catalyst selected from the group consisting of strontium oxide, barium oxide, strontium hydroxide, barium hydroxide and a mixture thereof to prepare an organosilicone condensate.

In the methods described in the afore-mentioned patent literatures, rearrangement of the polyorganosiloxane chain is minimized and, thus, a polyorganosiloxane having a controlled structure is obtained. Further, these methods have an advantage that the catalyst can be easily separated from the obtained polyorganosiloxane by filtration because these catalysts are solid. These advantages are favorable particularly in fields where accurate control on materials is required and no remaining impurity is tolerable, for instance, the fields of optical materials, electronic materials and medical materials.

PRIOR LITERATURES

Patent Literatures

[Patent Literature 1] Japanese Patent Application Laid-Open No. H02-235933

[Patent Literature 2] Japanese Patent Application Laid-Open No. H03-197486

[Patent Literature 3] Japanese National Phase Publication No.2006-508216

[Patent Literature 4] Japanese National Phase Publication No.2010-506982

SUMMARY OF THE INVENTION

However, the alkaline earth catalysts described in the afore-mentioned patent literatures 1 to 4 are not idealistic for the preparation of a polyorganosiloxane. This is because hydroxides of alkaline earth metals have toxicity as often pointed out. In particular, barium hydroxide is designated as a deleterious substance in Article 2 of the Cabinet Order for the Designation of the Poisonous and Deleterious Substances in Japan and, therefore, must be handled with care. Further, alkaline earth metal catalysts are so corrosive that if even a very small quantity of the catalyst remains in an obtained polyorganosiloxane, the polyorganosiloxane corrodes neighboring materials in a long-term use and may cause troubles. Additionally, alkaline earth metal catalyst is easily affected by moisture and carbon dioxide in air, so that a catalyst activity decreases in a long-term use.

One object of the present invention is to prepare a polyorganosiloxane without using any catalyst having corrosivity or toxicity such as an alkaline earth metal catalyst, in a method comprises a step of condensation reacting at least one organic silicon compound having a silanol group (—SiOH) and/or an alkoxy silyl group (—SiOR).

To solve the aforesaid problems, the present inventors have made research and found that at least one catalyst selected from the group consisting of hydroxides or oxides of metal elements in Groups 3-15 of the periodic table is used to provide a desired polyorganosiloxane without using any catalyst having corrosivity and toxicity such as an alkaline earth metal catalyst and the polyorganosiloxane obtained does not corrode neighboring materials in a long-term use.

Thus, the present invention is a method for preparing a polyorganosiloxane, wherein the method comprises a step of condensation reacting at least one organic silicon compound having at least one —OX group bonding to a silicon atom in the molecule, wherein X is a hydrogen atom, an alkyl group having 1 to 10 carbon atoms or an alkoxyalkyl group having 2 to 10 carbon atoms, in the presence of a catalyst (C), characterized in that the catalyst (C) is at least one selected from the group consisting of hydroxides or oxides of metal elements in Groups 3-15 of the periodic table.

The present invention provides a polyorganosiloxane without using any catalyst having corrosivity and toxicity such as an alkaline earth metal catalyst in a method which comprises a step of condensation reacting at least one organic silicon compound having a silanol group and/or an alkoxy silyl group. Further, the polyorganosiloxane obtained in the present method does not corrode metal parts with time. Therefore, the polyorganosiloxane may be used as protection materials for electronic parts to provide products having good long-term reliability.

DETAILED DESCRIPTION OF THE INVENTION

The present invention will be described below in detail.

The present invention is characterized in that the catalyst (C) used in the condensation reaction is at least one selected from the group consisting of hydroxides or oxides of metal elements in Groups 3-15 of the periodic table. The catalyst (C) will be explained below in detail.

The component (C) is at least one selected from the group consisting of hydroxides of metal elements in Groups 3-15 of the periodic table and oxides of metal elements in Groups 3-15 of the periodic table (hereinafter, referred to as "metal compound"). The metal compound has a catalytic function for a condensation reaction of an organic silicon compound having a silanol group (—SiOH) and/or an alkoxysilyl group (—SiOR). In view of reactivity or availability, hydroxides or oxides of rare earth elements, iron group elements, platinum group elements and amphoteric metal elements are preferred. Examples of the metal compound include lanthanum (III) hydroxide, cerium (IV) hydroxide, zirconium (IV) hydroxide, iron (II) hydroxide, iron (III) hydroxide, cobalt (II) hydroxide, nickel (II) hydroxide, copper (II) hydroxide, gold (III) hydroxide, zinc (II) hydroxide, cadmium (II) hydroxide, aluminum (III) hydroxide, indium (III) hydroxide, thallium (I) hydroxide, lead (II) hydroxide, bismuth (III) hydroxide, manganese (IV) oxide, iron (II) oxide and copper (II) oxide. Among these, lanthanum (III) hydroxide, aluminum (III) hydroxide, iron (II) hydroxide, iron (III) hydroxide, copper (II) hydroxide, iron (II) oxide and copper (II) oxide are preferred in view of availability.

The present method may include a step of surface treating the catalyst (C) with a silane coupling agent before used in the condensation reaction. The catalytic activity is made higher by the surface treatment of the metal compound with a silane coupling agent. The surface treatment of the metal compound with the silane coupling agent may be conducted in a conventional manner. For instance, a wet process and a dry process are utilizable.

As the silane coupling agent, any known silane coupling agent may be used. Particularly, in view of the dispersibility of the catalyst, a preferred silane coupling agent has a chemical structure similar to an organic silicon compound which causes a condensation reaction, particularly similar to an organic silicon compound having an alkoxy group. Examples of the silane coupling agent include trimethoxysilane, triethoxysilane, methyltrimethoxysilane, decyltrimethoxysilane, vinyltrimethoxysilane, phenyltrimethoxysilane, styryltrimethoxysilane, 3,3,3-trifluoropropyltrimethoxysilane, 3-glicydyloxypropyldimethoxysilane, 3-glicydyloxypropyltrimethoxysilane, 3-methacryloxypropyltrimethoxysilane, 3-aminopropyltrimethoxysilane, 3-mercaptopropyltrimethoxysilane, 3-chloropropyltrimethoxysilane, 1,1,3,3,5,5-hexamethoxy-1,3,5-trimethyltrisiloxane, 1,1,5,5-tetramethoxy-1,3,5-trimethyltrisiloxane-3-ol, dimethyldimethoxysilane, dimethyldiethoxysilane, phenylmethyldimethoxysilane, diphenyldimethoxysilane, distyryldimethoxysilane, dipentafluorophenyldimethoxysilane and hexamethyldisilazane. Among these, vinyltrimethoxysilane, methyltrimethoxysilane and 3-glicydyloxypropyltrimethoxysilane are preferred.

An amount of the catalyst used in the present method is such that a molar amount of the catalyst (C) is 0.0001 to 20 mol %, preferably 0.01 to 10 mol %, more preferably 0.1 to 5 mol %, relative to a total molar amount of the organic silicone compound to be subjected to a condensation reaction. When the amount of the catalyst (C) is in the afore-mentioned range, a sufficient catalytic effect for the condensation reaction is attained. Further, in a step of removing the catalyst by filtration after the condensation reaction, a desired condensate is recovered effectively without clogging of a filter.

The present invention provides a method for preparing a polyorganosiloxane which comprises a step of condensation reacting at least one organic silicon compound having at least one —OX group bonding to a silicon atom in the molecule, wherein X is a hydrogen atom, an alkyl group having 1 to 10 carbon atoms or an alkoxyalkyl group having 2 to 10 carbon atoms.

In a first embodiment of the present method, the organic silicon compound comprises (A) at least one organic silicon compound having at least one silanol group in the molecule and (B1) at least one organic silicon compound having at least one —OX group bonding to a silicon atom in the molecule, wherein X is a hydrogen atom, an alkyl group having 1 to 10 carbon atoms or an alkoxyalkyl group having 2 to 10 carbon atoms.

In the second embodiment of the present method, the organic silicon compound comprises (B2) one or more organic silicon compounds having at least one —OX' group bonding to a silicon atom in the molecule, wherein X' is an alkyl group having 1 to 10 carbon atoms or an alkoxyalkyl group having 2 to 10 carbon atoms.

In the third embodiment of the present method, the organic silicon compound comprises one or more organic silicon compounds having at least one silanol group and at least one —OX' group bonding to a silicon atom in the molecule, wherein X' is an alkyl group having 1 to 10 carbon atoms or an alkoxyalkyl group having 2 to 10 carbon atoms.

Each embodiment is explained below in detail.

First Embodiment

In the first embodiment of the present invention, the component (A) is at least one organic silicon compound having at least one silanol group in the molecule and the component (B1) is at least one organic silicon compound having at least one —OX group bonding to a silicon atom in the molecule, wherein X is a hydrogen atom, an alkyl group having 1 to 10 carbon atoms or an alkoxyalkyl group having 2 to 10 carbon atoms. The organic silicon compound may be a monomer, dimer, oligomer or polymer. Further, when the organic silicon compound is an oligomer or a polymer, its structure may be linear, branched or linear with a branched part. Particularly, a linear structure is preferred. In a case where a condensate having a high molecular weight is desired, it is preferable that the polyorganosiloxane has two or more silanol or —OX groups in each molecule. Besides, when X in the component (B1) is a hydrogen atom, the component (A) may be same as the component (B).

The component (A) may be represented by the following general formula (1).

In the formula (1), $R^1$ is, independently of each other, a hydrogen atom or a monovalent hydrocarbon group having 1 to 18 carbon atoms, and optionally having an oxygen, halogen, nitrogen or sulfur atom, a and b are independent among the parenthesized repeating units, a is an integer of from 0 to 3 and b is an integer of from 0 to 4, provided that the total of a and b is from 0 to 4, preferably from 2 to 4. n is an integer of from 1 to 10,000, provided that the compound (A), organic silicon compound, has at least one —OH group bonding to a silicon atom in the molecule.

The component (B1) may be represented by the following general formula (2).

In the formula (2), $R^1$ is, independently of each other, a hydrogen atom or a monovalent hydrocarbon group having 1 to 18 carbon atoms, and optionally having an oxygen, halogen, nitrogen or sulfur atom, $R^2$ is, independently of each other, an alkyl group having 1 to 10 carbon atoms or an alkoxyalkyl group having 2 to 10 carbon atoms, a, b and c are independent among the parenthesized repeating units, a is an integer of from 0 to 3, b is an integer of from 0 to 4, and c is an integer of from 0 to 4, provided that the total of a, b and c is from 0 to 4, preferably from 2 to 4. n is an integer of from 1 to 10,000, provided that the compound (B1), organic silicon compound, has at least one —OH group bonding to a silicon atom or —OR$^2$ group bonding to a silicon atom in the molecule.

In the formulas (1) and (2), $R^1$ is, independently of each other, a monovalent hydrocarbon group having 1 to 18, preferably 1 to 10 carbon atoms, and optionally having an oxygen, halogen, nitrogen or sulfur atom. Examples of $R^1$ include alkyl groups such as methyl, ethyl, propyl, butyl and octyl groups; cycloalkyl groups such as cyclopentyl and cyclohexyl groups; alkenyl groups such as vinyl and allyl groups; aryl groups such as phenyl, tolyl and naphthyl groups; and aralkyl groups such as benzyl, phenylethyl and phenylpropyl groups; and these groups where a part or the whole of their hydrogen atoms bonding to carbon atoms are replaced with a halogen atom(s), such as fluorine, bromine and chlorine atoms, or with a cyano group, such as, for instance, halogen-substituted monovalent hydrocarbon groups such as trifluoropropyl and chloropropyl groups; a cyanoalkyl groups such as a β-cyanoethyl and γ-cyanopropyl groups; 3-methacryloxypropyl group, 3-glycidyloxypropyl group, 3-mercaptopropyl group and 3-aminopropyl group. Among these, methyl group is preferred.

In the aforesaid formula (2), $R^2$ is, independently of each other, an alkyl group having 1 to 10, preferably 1 to 8 carbon atoms or an alkoxyalkyl group having 2 to 10, preferably 2 to 8 carbon atoms. Examples of $R^2$ include alkyl groups such as methyl, ethyl, propyl, butyl and octyl groups; and alkoxyalkyl group such as methoxymethyl, methoxyethyl and ethoxymethyl groups. Among these, a methyl group is preferred.

In the formulas (1) and (2), n is an integer of from 1 to 10,000, preferably 1 to 1,000. As described above, the organic silicon compound represented by the formula (1) or (2) may be a monomer (i.e., n is 1), dimer (i.e., n is 2), oligomers (e.g., n is 3 to 100) or polymer (e.g., n is 100 to 10,000). In particular, a monomer (i.e., n is 1) and a dimer (i.e., n is 2) are preferred.

The component (A) is more preferably an organic silicon compound represented by the following formula (I).

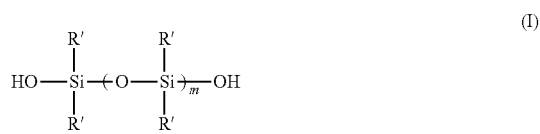

wherein R' is —OH or R', m is n-1, and $R^1$ and n are as defined above.

Examples of the organic silicon compound represented by the formula (I) includes 1,1,3,3-tetramethyldisiloxane-1,3-diol, 1,1,3,3,5,5-hexamethyltrisiloxane-1,5-diol, 1,1,3,5,5-pentamethyltrisiloxane-1,3,5-triol, 3-glycidyloxypropylmethylsilanetriol, 3-methacryloxypropylsilanetriol, 3-aminopropylsilanetriol, 3-mercaptpropylsilanetriol, 3-chloropropylsilanetriol, silicic acid, phenylmethylsilanediol, diphenylsilanediol, distyrylsilanediol and dipentafluorophenylsilanediol. Among these, diphenylsilanediol is preferred as it is easily available.

The component (B1) is more preferably an organic silicon compound represented by the following formula (II) or (III).

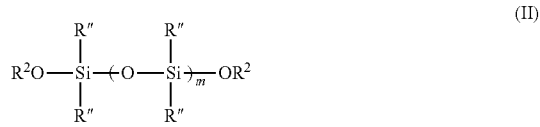

wherein R" is —OH, —OR$^2$ or $R^1$, preferably —OR$^2$ or $R^1$, m is n-1, and $R^1$, $R^2$ and n are as defined above.

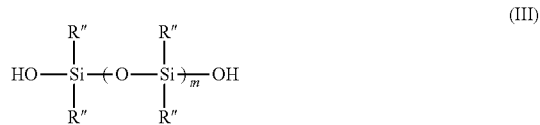

wherein R" is —OH, —OR$^2$ or $R^1$, preferably —OH or $R^1$, m is n-1, and $R^1$, $R^2$ and n are as defined above.

Examples of the organic silicon compound represented by the formula (II) include tetramethoxysilane, tetraethoxysilane, trimethoxysilane, triethoxysilane, methyltrimethoxysilane, decyltrimethoxysilane, vinyltrimethoxysilane, phenyltrimethoxysilane, styryltrimethoxysilane, 3,3,3-trifluoropropyltrimethoxysilane, 3-glicydyloxypropyldimethoxysilane, 3-methacryloxypropyltrimethoxysilane, 3-aminopropyltrimethoxysilane, 3-mercaptpropyltrimethoxysilane, 3-chloropropyltrimethoxysilane, 1,1,5,5-tetramethoxy-1,3,5-trimethyltrisiloxane-3-ol, dimethyldimethoxysilane, dimethyldiethoxysilane, phenylmethyldimethoxysilane, diphenyldimethoxysilane, distyryldimethoxysilane and dipentafluorophenyldimethoxysilane. Tetramethoxysilane and trimethoxysilane are preferred in view of the reactivity. Further, examples of the organic silicon compound represented by the aforesaid formula (III) includes some of the organic silicon compounds represented by the afore-mentioned formula (I), and 3-methoxy-1,3,5-trimethyltrisiloxane-1,1,5,5-tetraol.

A blend ratio of the components (A) to (B) may be decided properly, depending on a structure of a desired product, polyorganosiloxane. In particular, the number of the silanol group in the component (A) is preferably equal to the number of the —OX group in the component (B) when a condensate having high molecular weight is desired. Thus, it is preferable that the ratio of the number of the silanol group in the component (A) relative to the number of —OX group in the component (B) is 0.5 to 1.5, in particular 0.8 to 1.2, further 0.9 to 1.1. For instance, when diphenylsilandiol is used as the component (A) and vinyl trimethoxysilane is used as the component (B), the molar ratio of the component (A) to the component (B) is preferably 3:2.

Second Embodiment

In the second embodiment of the present invention, the component (B2) is one or more organic silicon compounds having at least one —OX' group bonding to a silicon atom in the molecule, wherein X' is an alkyl group having 1 to 10 carbon atoms or an alkoxyalkyl group having 2 to 10 carbon atoms. The organic silicon compound may be a monomer, dimer, oligomer and polymer. Further, when the organic silicon compound is an oligomer or a polymer, its structure may be linear, branched or linear with a branched part. Particularly, a linear structure is preferred. In a case where a condensate having a high molecular weight is desired, the polyorganosiloxane preferably has two or more —OX' groups in the molecule.

The component (B2) may be represented by the following general formula (3).

$$(R^1_a SiO_{(4-a-c)/2}(OR^2)_c)_n \quad (3)$$

In the formula (3), $R^1$ is, independently of each other, a hydrogen atom or a monovalent hydrocarbon group having 1 to 18, preferably 1 to 10 carbon atoms, and optionally having an oxygen, halogen, nitrogen or sulfur atom. Examples of $R^1$ are as described for the formulas (1) and (2) above. $R^2$ is, independently of each other, an alkyl group having 1 to 10, preferably 1 to 8 carbon atoms or an alkoxyalkyl group having 2 to 10, preferably 2 to 8 carbon atoms. Examples of $R^2$ are as described for the formula (2) above.

In the formula (3), a and c are independent among the parenthesized repeating units, a is an integer of from 0 to 3 and c is an integer of from 0 to 4, provided that the total of a and c is from 0 to 4, preferably from 2 to 4, provided that the organic silicon compound of formula (3) has at least one —OR² group in the molecule.

In the formula (3), n is an integer of from 1 to 10,000, preferably 1 to 1,000. As described above, the organic silicon compound represented by the formula (3) may be a monomer (i.e., n is 1), dimer (i.e., n is 2), oligomer (e.g., n is 3 to 100) or polymer (e.g., n is 100 to 10,000). In particular, a monomer (i.e., n is 1) and a dimer (i.e., n is 2) are preferred.

The component (B2) is more preferably an organic silicon compound represented by the following formula (IV).

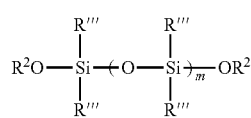

(IV)

wherein R''' is —OR² or R¹, m is n-1, and R¹, R² and n are as defined.

Examples of the organic silicon compound represented by the afore-said formula (IV) includes tetramethoxysilane, tetraethoxysilane, trimethoxysilane, triethoxysilane, methyltrimethoxysilane, decyltrimethoxysilane, vinyltrimethoxysilane, phenyltrimethoxysilane, styryltrimethoxysilane, 3,3,3-trifluoropropyltrimethoxysilane, 3-glicydyloxypropyldimethoxysilane, 3-methacryloxypropyltrimethoxysilane, 3-aminopropyltrimethoxysilane, 3-mercaptopropyltrimethoxysilane, 3-chloropropyltrimethoxysilane, dimethyldimethoxysilane, dimethyldiethoxysilane, phenylmethyldimethoxysilane, diphenyldimethoxysilane, distyryldimethoxysilane and dipentafluorophenyldimethoxysilane. Tetramethoxysilane and trimethoxysilane are preferred in view of the reactivity.

In a case when two or more kinds of the organic silicon compounds are condensation reaction with each other, a mixing ratio of the components may be desired properly, depending on structure of a desired polyorganosiloxane. In particular, the number of the —OX' group in one component is preferably equal to that in the other component. For instance, the ratio of the number of —OX' group in one organic silicon component relative to the number of —OX' group in the other organic silicon component is preferably 0.5 to 1.5, in particular 0.8 to 1.2, further 0.9 to 1.1.

Third Embodiment

The third embodiment of the present invention is a method for preparing a polyorganosiloxane comprising a step of subjecting one or more organic silicon compounds having at least one silanol group and at least one —OX' group bonding to a silicon atom in the molecule to a condensation reaction with each other, wherein X' is an alkyl group having 1 to 10 carbon atoms or an alkoxyalkyl group having 2 to 10 carbon atoms. The organic silicon compound may be a monomer, dimer, oligomer or polymer. Further, when the organic silicon compound is an oligomer or a polymer, its structure may be linear, branched or linear with a branched part. Particularly, a linear structure is preferred.

The aforesaid organic silicon compound may be represented by the following general formula (4).

$$(R^1_a SiO_{(4-a-b-c)/2}(OH)_b(OR^2)_c)_n \quad (4)$$

In the formula (4), $R^1$ is, independently of each other, a hydrogen atom or a monovalent hydrocarbon group having 1 to 18 carbon atoms, and optionally having an oxygen, halogen, nitrogen or sulfur atom. Examples of $R^1$ are as described for the formulas (1) and (2) above. $R^2$ is, independently of each other, an alkyl group having 1 to 10, preferably 1 to 8 carbon atoms or an alkoxyalkyl group having 2 to 10, preferably 2 to 8 carbon atoms. Examples of $R^2$ are as described for the formula (2) above.

In the formula (4), a, b and c are independent among the parenthesized repeating units, a is an integer of from 0 to 3, b is an integer of from 0 to 4 and c is an integer of from 0 to 4, provided that the total of a, b and c is from 0 to 4, preferably from 2 to 4, provided that the organic silicon compound of formula (4) has at least one —OH group and at least one —OR² group in the molecule.

In the formula (4), n is an integer of from 1 to 10,000, preferably 1 to 1,000. As described above, the organic silicon compound represented by the formula (4) may be a monomer (i.e., n is 1), dimer (i.e., n is 2), oligomer (e.g., n is 3 to 100) or polymer (e.g., n is 100 to 10,000). In particular, a monomer (i.e., n is 1) and a dimer (i.e., n is 2) are preferred.

The aforesaid organic silicon compound is preferably represented by the following formula (v) or (VI).

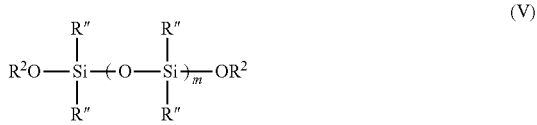

(V)

wherein R" is —OH, —OR² or R¹, provided that at least one of R" is —OH, m is n-1, R¹, R² and n are as defined above.

(VI)

wherein R" is —OH, —OR² or R¹, provided that at least one of R" is —OR², m is n-1, R¹, R² and n are as defined above.

Examples of the organic silicon compound represented by the afore-mentioned formula (V) or (VI) include 1,1,5,5-tetramethoxy-1,3,5-trimethyltrisiloxane-3-ol, 3-methoxy-1,3,5-trimethyltrisiloxane-1,1,5,5-tetraol, 1,3-dimethoxy-1,3-dimethyldisiloxane-1,3-diol, 1,3,5-trimethoxy-1,3,5-trimethyltrisiloxane-1,5-diol, 3-methoxy-1,1,5,5-tetramethyltrisiloxane-1,3,5-triol, methoxymethylsilanediol and dimethoxysilanediol.

In a case where two or more kinds of the organic silicon compounds are a condensation reacted with each other, a mixing ratio of the components may be decided properly, depending on structure of a desired polyorganosiloxane. In particular, the total number of the silanol and —OX' groups in one component is preferably equal to that in the other component when a condensate having high molecular weight is desired. For instance, the ratio of the total number of silanol and —OX' groups in one organic silicon component relative to the total number of silanol and —OX' groups in the other organic silicon component is preferably 0.5 to 1.5, in particular 0.8 to 1.2, further preferably 0.9 to 1.1.

The condensation reaction in the present invention may be carried out in the presence of at least one solvent (D). The solvent is used to control a rate and conversion of the reaction, or used as a diluent for a condensate obtained. The solvent may be one or more selected from non-polar solvents and polar solvents. Examples of the non-polar solvents include hydrocarbons such as n-hexane, n-heptane and isooctane; aromatic hydrocarbons such as toluene and xylene. Examples of the polar solvents include water; alcohols such as methanol, ethanol and isopropanol; alcohol esters; ketones such as acetone, methylethylketone and cyclohexanone; ethers such as diethyl ether and dibutyl ether; esters such as ethyl acetate, isopropyl acetate and butyl acetate; hydrocarbon cyanides such as acetonitrile; amines; amides such as acetamide; halogenated hydrocarbons such as methylene chloride, chloroform and hexafluoromethaxylene; and sulfur-containing compounds such as dimethylsulfoxide. An amount of the solvent is not limited to particular one. Generally, the amount is such that a concentration of the organic silicon compounds subjected to the condensation reaction is 3 to 97 weight %, preferably 20 to 80 weight %. Besides, the condensation reaction in the present invention can be conducted without any solvent.

In the present condensation reaction, any other components may also be used as long as such does not obstruct the progress of the condensation reaction. For instance, a neutral surfactant may be added so as to improve dispersion of a solid catalyst. When the group represented by R¹ in the formulas (1) to (4) is reactive, a reaction inhibitor may be added. The afore-mentioned components may be used alone or in combination two or more of them. Further, an amount of the component may be decided properly so that the effects of the present invention are not obstructed.

The condensation reaction in the present invention may be conducted under heat conditions. A temperature is preferably 0 to 150 degrees C., more preferably 60 to 100 degrees C.

The present method preferably further comprises a step of filtering a catalyst after finishing the condensation reaction. In the present method, the catalyst is easily removed from a reaction product in this step. In the filtration, the afore-mentioned solvent (D) may be added in order to control viscosity of the reaction mixture obtained.

Further, the present method may comprise a step of purification in order to remove an unreacted monomer from the reaction mixture by any known method such as water washing with, vacuum strip and treatment with activated carbon.

The present invention provides a polyorganosiloxane without using any catalyst having corrosivity and toxicity such as a hydroxide of an alkaline earth metal in a method which comprises a step of condensation reacting at least one organic silicon compound having a silanol group and/or an alkoxy silyl group. Further, the polyorganosiloxane obtained in the present method does not corrode metal parts with time. Therefore, the polyorganosiloxane may be used as protection materials for electronic parts to provide products having good long-term reliability.

EXAMPLES

The present invention will be explained below in further detail with reference to a series of the Examples and the Comparative Examples, though the present invention is in noway limited by these Examples. In the following descriptions, the term "part" refers to "part by mass".

The weight average molecular weight (Mw) described in the Examples is as determined by gel permeation chromatography, i.e., GPC, and reduced to polystyrene. Conditions in GPC were as follows.
[GPC Conditions]
Solvent: Tetrahydrofuran
Flow rate: 0.6 mL/min.
Columns; all provided by TOSOH Cop.
TSK Guardcolumn SuperH-L
TSKgel SuperH4000 (6.0 mm I.D.×15 cm×1)
TSKgel SuperH3000 (6.0 mm I.D.×15 cm×1)
TSKgel SuperH2000 (6.0 mm I.D.×15 cm×2)
Column Temperature: 40 degrees C.
Injection Volume: 20 μl of a 0.5% by weight solution in THF.
Detector: Differential refractive index detector (RI)

The components used in the Examples and Comparative Examples are as follows.

(1)

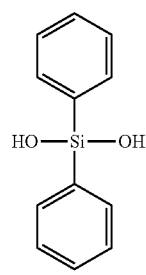

Diphenylsilanediol (DPS)

-continued (2)
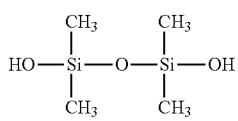
1,1,3,3-Tetramethyldisiloxane-1,3-diol (TDS)

(3)
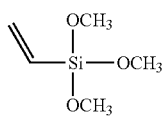
Trimethoxyvinylsilane (TVS)

(4)
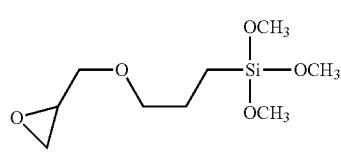
3-Glycidyloxypropyltrimethoxysilane (GTS)

Examples 1-17 and Comparative Example 1

Preparation of a Polyorganosiloxane 259.57 g (1.2 mols) of diphenyl silane diol (DPS), 118.59 g (0.8 mol) of trimethoxyvinylsilane (TVS) and a solvent of the amount described in the following Table 1 were mixed. No solvent was used in Examples 1, 5, 9 and 14. The mixture was heated at 80 degrees C. for 10 minutes with stirring. Then, 0.1 mol of the catalyst described in the following Table 1 was added to the mixture and heated at 80 degrees C. for 96 hours to react, while removing methanol. During the reaction, the reaction mixture was observed to record a time when the reaction mixture turned from white turbid to transparent, which means that all of the DPS monomer, which is solid powder, reacted. The time is as shown in Table 1. Further, samples of the mixture were taken at the times of 8 hours and 96 hours after starting the reaction. The weight average molecular weights (Mw) of the polymer in the samples were determined by GPC. The results are as shown in Table 1. After 96 hours, the solvent was removed and, then, the catalyst was removed by filtration through a filter having pore sizes of 0.45 μm to obtain a polyorganosiloxane.

TABLE 1

| | Catalyst | Solvent | Amount of a solvent, wt % | Time until all of the DPS monomer reacted, | Mw, after 8 hours. | Mw, after 96 hours. |
| --- | --- | --- | --- | --- | --- | --- |
| Example 1 | Fe(OH)$_3$ | — | — | 4 | 1031 | 1360 |
| Example 2 | Fe(OH)$_3$ | Xylene | 20 | 7 | 690 | 1048 |
| Example 3 | Fe(OH)$_3$ | Methanol | 10 | 3 | 1156 | 1455 |
| Example 4 | Fe(OH)$_3$ | Water | 3 | 4 | 1083 | 1404 |
| Example 5 | Al(OH)$_3$ | — | — | 12 | The reaction of DPS and TVS did not finish yet. | 903 |
| Example 6 | Al(OH)$_3$ | Xylene | 20 | 24 | The reaction of DPS and TVS did not finish yet. | 788 |
| Example 7 | Al(OH)$_3$ | Methanol | 10 | 6 | 721 | 1073 |
| Example 8 | Al(OH)$_3$ | Water | 3 | 7 | 678 | 1011 |
| Example 9 | Cu(OH)$_2$ | — | — | 6 | 744 | 1100 |
| Example 10 | Cu(OH)$_2$ | Xylene | 20 | 9 | The reaction of DPS and TVS did not finish yet. | 992 |
| Example 11 | Cu(OH)$_2$ | Methanol | 10 | 4 | 1063 | 1384 |
| Example 12 | Cu(OH)$_2$ | Water | 3 | 4 | 1013 | 1355 |
| Example 13 | CuO | Methanol and water | 10 + 3 | 72 | The reaction of DPS and TVS did not finish yet. | 689 |
| Example 14 | La(OH)$_3$ | — | — | 4 | 992 | 1322 |
| Example 15 | La(OH)$_3$ | Xylene | 20 | 7 | 671 | 1008 |
| Example 16 | La(OH)$_3$ | Methanol | 10 | 3 | 1100 | 1431 |
| Example 17 | La(OH)$_3$ | Water | 3 | 4 | 1065 | 1398 |
| Comparative Example 1 | Ba(OH)$_2$ | Xylene | 50 | 0.5 | 1563 | 1598 |

Corrosivity Test

The organopolysiloxanes obtained in Examples 1 to 17 and Comparative Example 1 were subjected to a corrosivity test to confirm whether the polyorganosiloxanes corrodes aluminum plates in a long-term storage or not. A test method and results will be described below.

Test Method

An aluminum plate having 15 mm×15 mm×0.5 mm was put in a glass petri dish having a diameter of 35 mm and a height of 17 mm. Each of the polyorganosiloxanes obtained in the afore-mentioned Examples and Comparative Example was poured in the glass petri dish to a depth of 10 mm from the bottom, and left at a humidity of 85% and a temperature of 85 degrees C. for 168 hours to observe extent corrosion of the surface of the aluminum plate.

Results

In the test samples comprising the polyorganosiloxanes obtained in Examples 1 to 17, the polyorganosiloxane did not corrode aluminum plates and the surface of the aluminum plates did not discolor at all. In contrast, in the test sample comprising the polyorganosiloxane obtained in Comparative Example 1, the polyorganosiloxane corroded aluminum plate and the color of the surface of the aluminum plate changed to white.

Examples 18-23 and Comparative Example 2

Preparation of a Polyorganosiloxane 259.57 g (1.2 mols) of diphenyl silane diol (DPS), 189.07 g (0.8 mol) of 3-glycidyloxypropyltrimethoxysilane (GTS) and a solvent of the amount described in the following Table 2 were mixed. No solvent was used in Examples 18, 20, 21 and 23. The mixture was heated at 80 degrees C. for 10 minutes with stirring. Then, 0.1 mol of the catalyst described in the following Table 2 was added to the mixture and heated at 80 degrees C. for 96 hours to react, while removing methanol. During the reaction, the reaction mixture was observed to record a time when the reaction mixture turned from white turbid to transparent, which means that all of the DPS monomer, which is solid powder, reacted. The time is as shown in Table 2. Further, samples of the mixture were taken at the times of 8 hours and 96 hours after starting the reaction. The weight average molecular weights (Mw) of the polymer in the samples were determined by GPC. The results are as shown in Table 2. After 96 hours, the solvent was removed and, then, the catalyst was removed by filtration through a filter having pore sizes of 0.45 μm to obtain a polyorganosiloxane.

TABLE 2

| | Catalyst | Solvent | Amount of a solvent, wt % | Time until all of the DPS monomer reacted, Hr | Mw, after 8 hours. | Mw, after 96 hours. |
|---|---|---|---|---|---|---|
| Example 18 | Fe(OH)₃ | — | — | 5 | 947 | 1261 |
| Example 19 | Fe(OH)₃ | Methanol | 10 | 4 | 1057 | 1336 |
| Example 20 | Al(OH)₃ | — | — | 24 | The reaction of DPS and GTS did not finish yet. | 681 |
| Example 21 | Cu(OH)₂ | — | — | 8 | 637 | 977 |
| Example 22 | CuO | Methanol and water | 10 + 3 | The reaction of DPS and GTS did not finish. | — | — |
| Example 23 | La(OH)₃ | — | — | 5 | 915 | 1206 |
| Comparative Example 2 | Ba(OH)₂ | Xylene | 50 | 1 | 1379 | 1390 |

Corrosivity Test

The organopolysiloxanes obtained in Examples 18 to 23 and Comparative Example 2 were subjected to a corrosivity test to confirm whether the polyorganosiloxane corrodes aluminum plates in a long-term storage or not. The test was conducted with the same manner described above. The results will be described below.

Results

In the test samples comprising the polyorganosiloxanes obtained in Examples 18 to 23, the polyorganosiloxanes did not corrode aluminum plates and the surface of the aluminum plates did not discolor at all. In contrast, in the test sample comprising the polyorganosiloxane obtained in Comparative Example 2, the polyorganosiloxane corroded aluminum plate and the color of the surface of the aluminum plate changed to white.

Examples 24-28 and Comparative Example 3

Preparation of a Polyorganosiloxane 199.60 g (1.2 mols) of 1,1,3,3-tetramethyldisiloxane-1,3-diol (TDS), 118.59 g (0.8 mol) of trimethoxyvinylsilane (TVS) and 79.55 g (20 wt %) of xylene were mixed and heated at 40 degrees C. for 10 minutes with stirring. Then, 0.1 mol of the catalyst described in the following Table 3 was added to the mixture and heated at 40 degrees C. for 96 hours to react. During the reaction, the reaction mixture was observed to record a time when the reaction mixture turned from white turbid to transparent, which means that all of the TDS monomer, which is solid powder, reacted. The time is as shown in Table 3. Further, samples of the mixture were taken at the times of 48 hours and 96 hours after starting the reaction. The weight average molecular weights (Mw) of the polymer in the samples were determined by GPC. The results are as shown in Table 3. After 96 hours, the solvent was removed and, then, the catalyst was removed by filtration through a filter having pore sizes of 0.45 μm to obtain a polyorganosiloxane.

TABLE 3

|  | Catalyst | Solvent | Amount of a solvent, wt % | Time until all of the TPS monomer reacted, Hr | Mw, after 48 hours. | Mw, after 96 hours. |
|---|---|---|---|---|---|---|
| Example 24 | Fe(OH)$_3$ | Xylene | 20 | 16 | 3948 | 5606 |
| Example 25 | Al(OH)$_3$ | Xylene | 20 | 48 | 1887 | 3178 |
| Example 26 | Cu(OH)$_2$ | Xylene | 20 | 24 | 2749 | 4866 |
| Example 27 | CuO | Xylene | 20 | 96 | The reaction of TDS and TVS did not finish yet. | 2008 |
| Example 28 | La(OH)$_3$ | Xylene | 20 | 18 | 3440 | 5316 |
| Comparative Example 3 | Ba(OH)$_2$ | Xylene | 50 | 2 | 5004 | 6590 |

Corrosivity Test

The organopolysiloxanes obtained in Examples 24 to 28 and Comparative Example 3 were subjected to a corrosivity test to confirm whether the polyorganosiloxane corrodes aluminum plates in a long-term storage or not. The test was conducted with the same manner described above. The results will be described below.

Results

In the test samples comprising the polyorganosiloxanes obtained in Examples 24 to 28, the polyorganosiloxane did not corrode aluminum plates and the surface of the aluminum plate did not discolor at all. In contrast, in the test sample comprising the polyorganosiloxane obtained in Comparative Example 3, the polyorganosiloxane corroded aluminum plate and the color of the surface of the aluminum plate changed to white.

As seen in the Tables, the polyorganosiloxane prepared in the presence of an alkaline earth metal catalyst corrodes an aluminum plate and causes discoloration of a surface of an aluminum plate in a long-term use. In contrast, the present method which uses hydroxides or oxides of metal elements in Groups 3-15 of the periodic table as a catalyst provides a polyorganosiloxane which does not corrode aluminum plates or other materials.

INDUSTRIAL APPLICABILITY

The present invention provides a polyorganosiloxane without using any catalyst having corrosivity and toxicity such as an alkaline earth metal catalyst. Further, the polyorganosiloxane obtained in the present method does not corrode metal parts with time. Therefore, the polyorganosiloxane may be used as protection materials for electronic parts to provide products having good long-term reliability.

The invention claimed is:

1. A method for preparing a polyorganosiloxane, wherein the method comprises a step of condensation reacting at least one organic silicon compound having at least one —OX group bonding to a silicon atom in the molecule without water, wherein X is a hydrogen atom, an alkyl group having 1 to 10 carbon atoms or an alkoxyalkyl group having 2 to 10 carbon atoms, in the presence of a catalyst, wherein (i) said organic silicon compound comprises
        (A) at least one organic silicon compound having at least one silanol group in the molecule, and
        (B1) at least one organic silicon compound having at least one —OX group bonding to a silicon atom in the molecule, wherein X is a hydrogen atom, an alkyl group having 1 to 10 carbon atoms or an alkoxyalkyl group having 2 to 10 carbon atoms; or (ii) said organic silicon compound comprises one or more organic silicon compounds having at least one silanol group and at least one —OX' group bonding to a silicon atom in the molecule, wherein X' is an alkyl group having 1 to 10 carbon atoms or an alkoxyalkyl group having 2 to 10 carbon atoms, wherein the catalyst is at least one selected from the group consisting of hydroxides of rare earth elements, hydroxides of iron group elements, hydroxides of platinum group elements, zirconium (IV) hydroxide, copper (II) hydroxide, gold (III) hydroxide, cadmium (II) hydroxide, indium (III) hydroxide, thallium (I) hydroxide, lead (II) hydroxide and bismuth (III) hydroxide.

2. The method according to claim 1, wherein an amount of the catalyst is such that an amount of the component is 0.0001 to 20 mol %, based on a total molar amount of the organic silicon compound subjected to the condensation reaction.

3. The method according to claim 1, wherein the component (A) is represented by the following general formula (1):

wherein R$^1$ is, independently of each other, a hydrogen atom or a monovalent hydrocarbon group having 1 to 18 carbon atoms, and optionally having an oxygen, halogen, nitrogen or sulfur atom, a and b are independent among the parenthesized repeating units, a is an integer of from 0 to 3 and b is an integer of from 0 to 4, provided that the total of a and b is from 0 to 4, and n is an integer of from 1 to 10,000, provided that the organic silicon compound has at least one —OH group bonding to a silicon atom in the molecule, and the component (B1) is represented by the following general formula (2):

wherein R$^1$ is, independently of each other, a hydrogen atom or a monovalent hydrocarbon group having 1 to 18 carbon atoms, and optionally having an oxygen, halogen, nitrogen or sulfur atom, R$^2$ is, independently of each other, an alkyl group having 1 to 10 carbon atoms or an alkoxyalkyl group having 2 to 10 carbon atoms, a, b and c are independent among the parenthesized repeating units, a is an integer of from 0 to 3, b is an integer of from 0 to 4, and c is an integer of from 0 to 4, provided that the total of a, b and c is from 0 to 4, and n is an integer of from 1 to 10,000, provided that the organic silicon compound has at least one —OH group bonding to a silicon atom or —OR$^2$ group bonding to a silicon atom in the molecule.

4. The method according to claim 1, wherein the organic silicon compound is represented by the following general formula (4):

wherein $R^1$ is, independently of each other, a hydrogen atom or a monovalent hydrocarbon group having 1 to 18 carbon atoms, and optionally having an oxygen, halogen, nitrogen or sulfur atom, $R^2$ is, independently of each other, an alkyl group having 1 to 10 carbon atoms or an alkoxyalkyl group having 2 to 10 carbon atoms, a, b and c are independent, among the parenthesized repeating units, a is an integer of from 0 to 3, b is an integer of from 0 to 4, and c is an integer of from 0 to 4, provided that the total of a, b and c is from 0 to 4, and n is an integer of from 1 to 10,000, provided that the organic silicon compound has at least one —OH group bonding to a silicon atom and at least one —$OR^2$ group bonding to a silicon atom in the molecule.

5. The method according to claim 1, wherein the condensation reaction is carried out in the presence of (D) at least one solvent is not water.

6. The method according to claim 5, the solvent is at least one selected from the group consisting of hydrocarbons, aromatic hydrocarbons, alcohols, alcohol esters, ketones, ethers, esters, hydrocarbon cyanides, amines, amides, halogenated hydrocarbons and sulfur-containing compounds.

7. The method according to claim 1, wherein the method further includes a step of surface treating the catalyst (C) with a silane coupling agent before the condensation reaction.

8. The method according to claim 1, wherein the catalyst is at least one selected from the group consisting of lanthanum (III) hydroxide, cerium (IV) hydroxide, zirconium (IV) hydroxide, iron (II) hydroxide, iron (III) hydroxide, cobalt (II) hydroxide, nickel (II) hydroxide, copper (II) hydroxide, gold (III) hydroxide, cadmium (II) hydroxide, indium (III) hydroxide, thallium (I) hydroxide, lead (II) hydroxide and bismuth (III) hydroxide.

9. The method according to claim 8, wherein the catalyst is at least one selected from the group consisting of lanthanum (III) hydroxide, iron (II) hydroxide, iron (III) hydroxide and copper (II) hydroxide.

10. The method according to claim 8, further comprising a step of surface treating the catalyst with a silane coupling agent before the condensation reaction.

11. The method according to claim 9, further comprising a step of surface treating the catalyst with a silane coupling agent before the condensation reaction.

12. The method according to claim 1, wherein the condensation reaction is carried out without any solvent.

13. The method according to claim 2, wherein the condensation reaction is carried out without any solvent.

14. The method according to claim 3, wherein the condensation reaction is carried out without any solvent.

15. The method according to claim 4, wherein the condensation reaction is carried out without any solvent.

* * * * *